United States Patent
Cai et al.

(10) Patent No.: US 6,894,455 B2
(45) Date of Patent: May 17, 2005

(54) PERFORMANCE IMPROVEMENT OF INTEGRATED STARTER ALTERNATOR BY CHANGING STATOR WINDING CONNECTION

(75) Inventors: Wei Cai, Carmel, IN (US); David Fulton, Anderson, IN (US)

(73) Assignee: Remy Inc., Anderson, IN (US)

( * ) Notice: Subject to any disclaimer, the term of this patent is extended or adjusted under 35 U.S.C. 154(b) by 0 days.

(21) Appl. No.: 10/426,268

(22) Filed: Apr. 30, 2003

(65) Prior Publication Data

US 2004/0217723 A1 Nov. 4, 2004

(51) Int. Cl.[7] .............................................. H02P 5/28
(52) U.S. Cl. ...................... 318/771; 318/785; 318/786
(58) Field of Search ................................ 318/771–798; 322/28, 90; 310/113, 179, 184, 198; 290/46

(56) References Cited

U.S. PATENT DOCUMENTS

| | | | |
|---|---|---|---|
| 1,460,157 A | | 6/1923 | Hellmund |
| 1,467,745 A | | 9/1923 | Zederbohm |
| 3,689,826 A | * | 9/1972 | Cherry ........................ 322/29 |
| 3,735,222 A | * | 5/1973 | Pryjmak ..................... 318/799 |
| 3,742,370 A | | 6/1973 | Hansen |
| 4,219,739 A | | 8/1980 | Greenwell |
| 4,400,629 A | | 8/1983 | Kratzmair |
| 4,425,539 A | | 1/1984 | Wills |
| 4,459,536 A | | 7/1984 | Wirtz |
| 4,503,412 A | | 3/1985 | Alsch |
| 4,710,661 A | | 12/1987 | Gjota |
| 4,890,049 A | | 12/1989 | Auinger |
| 4,916,345 A | | 4/1990 | Tong |
| 4,947,100 A | * | 8/1990 | Dhyanchand et al. ......... 322/10 |
| 4,948,997 A | | 8/1990 | Ohmitsu et al. |
| 5,012,177 A | * | 4/1991 | Dhyanchand et al. ......... 322/10 |
| 5,049,800 A | * | 9/1991 | Kohari et al. ............... 318/771 |
| 5,051,639 A | * | 9/1991 | Satake et al. ............... 310/112 |
| 5,068,559 A | | 11/1991 | Satake et al. |
| 5,068,587 A | | 11/1991 | Nakamura |
| 5,142,213 A | * | 8/1992 | Stelter ........................ 318/771 |
| 5,146,148 A | | 9/1992 | Voet |
| 5,387,859 A | * | 2/1995 | Murugan et al. ............. 322/10 |
| 5,449,962 A | * | 9/1995 | Shichijyo et al. ........... 310/184 |
| 5,675,222 A | | 10/1997 | Fliege |
| 5,713,320 A | | 2/1998 | Pfaff et al. |
| 5,760,567 A | * | 6/1998 | Nakamura et al. .......... 318/777 |
| 5,838,085 A | * | 11/1998 | Roesel et al. ............... 310/113 |
| 5,990,590 A | * | 11/1999 | Roesel et al. ............... 310/113 |
| 6,002,219 A | | 12/1999 | Permuy |
| 6,049,188 A | | 4/2000 | Smith |
| 6,153,942 A | | 11/2000 | Roseman et al. |
| 6,154,003 A | * | 11/2000 | Satake et al. ............... 318/771 |
| 6,177,734 B1 | | 1/2001 | Masberg et al. |
| 6,326,713 B1 | | 12/2001 | Judson |
| 6,333,578 B1 | | 12/2001 | Nakamura et al. |
| 6,373,230 B2 | * | 4/2002 | Jabaji ........................... 322/28 |
| 6,445,157 B2 | * | 9/2002 | Lang et al. .................. 318/771 |
| 6,554,088 B2 | * | 4/2003 | Severinsky et al. ........ 180/65.2 |
| 6,703,747 B2 | * | 3/2004 | Kawamura .................. 310/179 |
| 2001/0039230 A1 | * | 11/2001 | Severinsky et al. ............. 477/3 |
| 2002/0060505 A1 | * | 5/2002 | Kawamura .................. 310/184 |
| 2002/0097025 A1 | * | 7/2002 | Gale et al. ..................... 322/28 |

FOREIGN PATENT DOCUMENTS

| | | |
|---|---|---|
| JP | 56129597 A | 10/1981 |
| JP | 57113795 A | 7/1982 |
| JP | 61073591 A | 4/1986 |
| JP | 62262690 A | 11/1987 |
| JP | 63206195 A | 8/1988 |
| JP | 05223390 A | 8/1993 |

* cited by examiner

*Primary Examiner*—Paul Ip
(74) *Attorney, Agent, or Firm*—Ice Miller (57) ABSTRACT

A method for controlling voltages in an integrated starter alternator electric machine is provided where the armature windings are manipulated in a Δ/Y/Δ fashion. In particular, the armature windings are arranged in a Δ connection during engine cranking operation, when the electric machine acts as a starter motor. After the engine is cranked, the windings are changed into a Y connection when the ISAD machine changes from motoring to generating and operates a low speeds, such as idle speed. Next, when the engine speed increases above a predetermined winding reconfiguration speed, the windings are switched from Y to Δ connection. If the engine speed falls below the winding reconfiguration speed, the machine again switches the armature windings to a Y connection to take advantage of the efficiencies of the Y connection at that low speed range in the generating state.

21 Claims, 9 Drawing Sheets

(a) GENERATING PERFORMANCE WITH Y-CONNECTION (b) GENERATING PERFORMANCE WITH Δ-CONNECTION

FIG. 10

PERFORMANCE IMPROVEMENT OF INTEGRATED STARTER ALTERNATOR BY CHANGING STATOR WINDING CONNECTION

BACKGROUND

The invention generally relates to the field of starter motors and alternators, including starter motors and alternators for truck and automotive applications.

Figure 1:
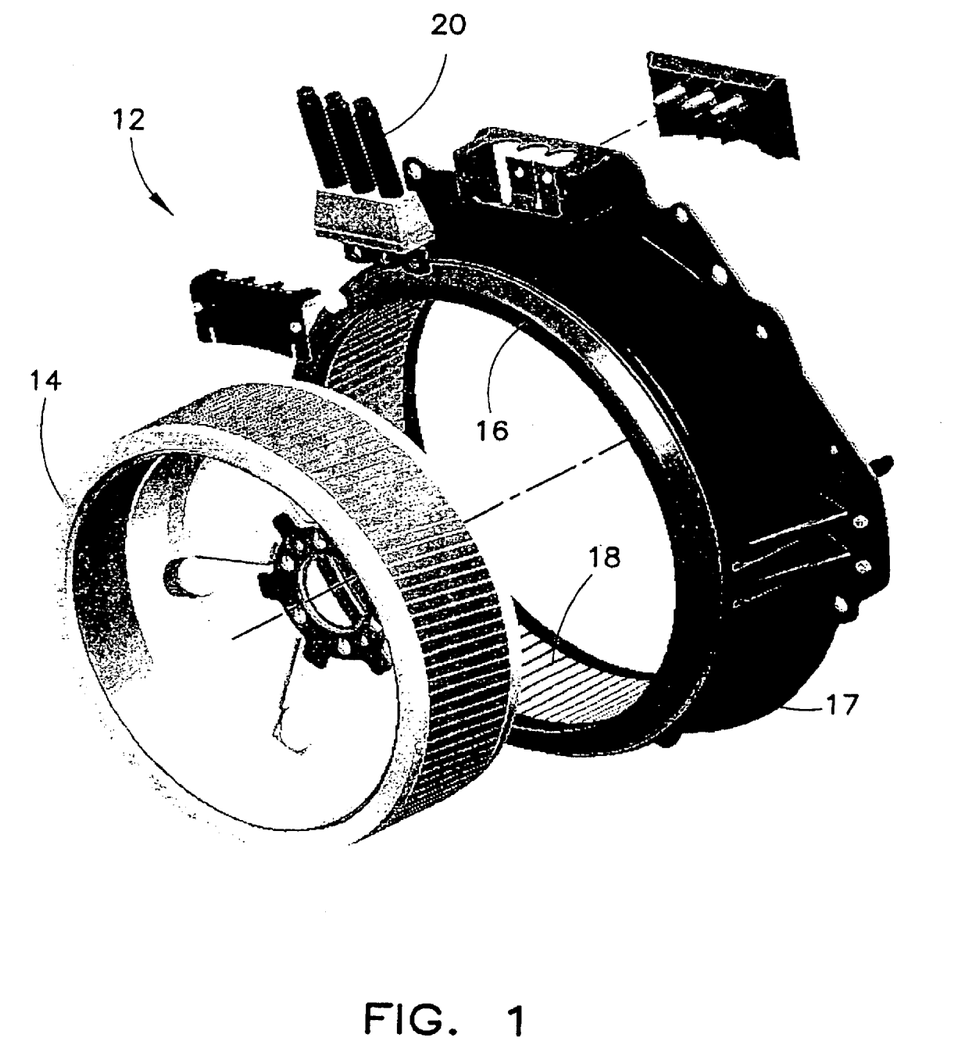
FIG. 1 shows a perspective view of the rotor and stator arrangement of an ISAD electric machine.

The Integrated Starter Alternator Damper (ISAD) is an electric machine used in the hybrid automotive and truck industries. As its name suggests, the ISAD integrates the functions of a starter, alternator, and flywheel damper, when connected to an engine. As indicated in FIG. 1, the ISAD electric machine 12 includes a rotor in electromagnetic communication with a stator 16 covered by a stator frame 17. The rotor 14 is a squirrel cage design made of cast aluminum and is designed for positioning within the stator 16. The stator 16 includes three phase windings 18 wound on the stator (i.e., the armature windings). The three phase windings 18 are connected to terminals 20 that extend from the stator frame 17. The terminals 20 are used to connect the three phase windings to an inverter/rectifier 22, located in an electronic control box.

Figure 2:
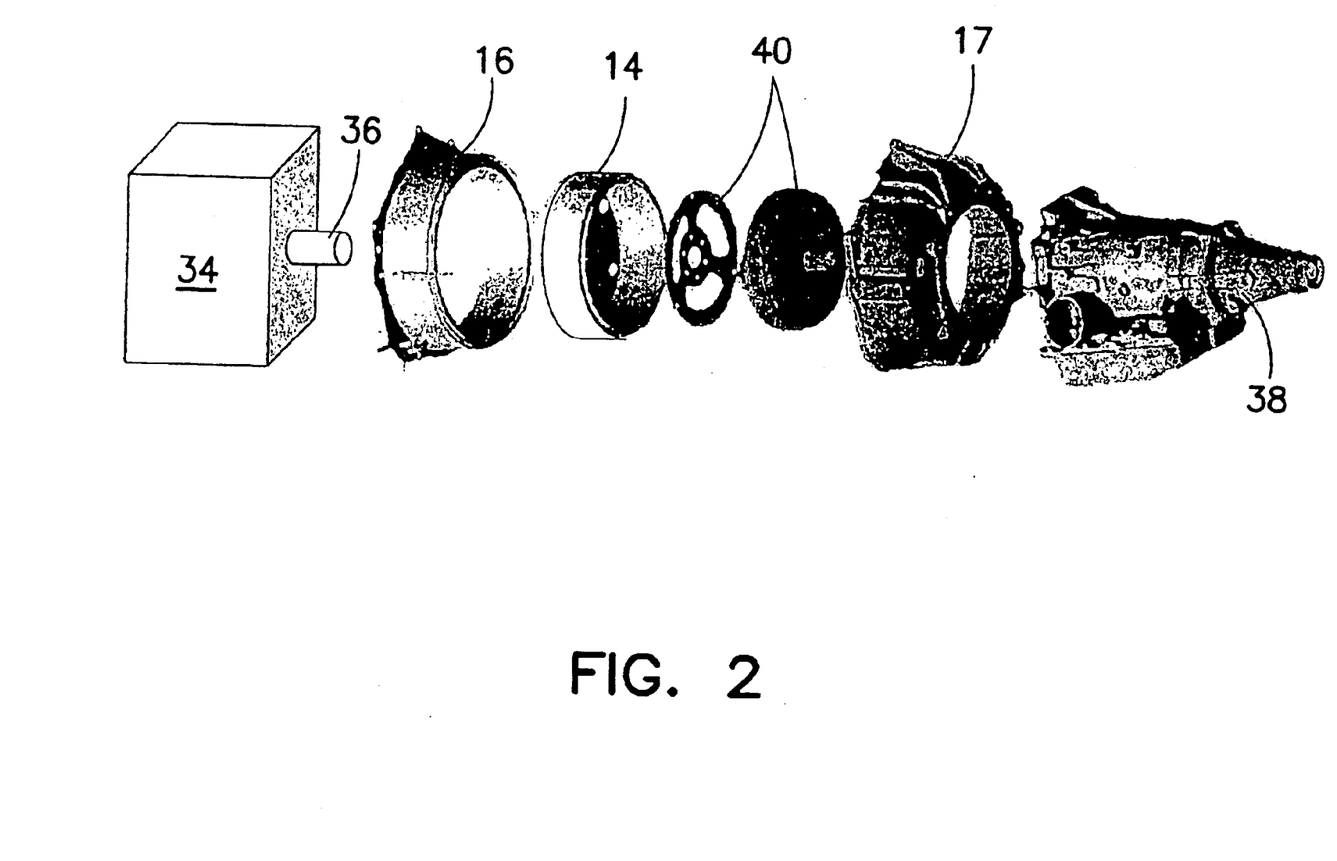
FIG. 2 shows the arrangement of the ISAD electric machine in association with an engine and gearbox.

FIG. 2 shows the arrangement of the ISAD rotor 14 and stator 16 in relation to an automotive engine 34. As shown in FIG. 2, the ISAD electrical machine is installed directly on the engine crankshaft 36 and linked to a gearbox 38 through a torque converter or clutch 40. The ISAD rotor 14 acts as a flywheel for the engine. The clutch disengages the gearbox from the ISAD during engine cranking, and connects the gearbox to the ISAD and the engine when power is required to the gearbox. Because the ISAD rotor is connected to the engine crankshaft, the speed of the electric machine has the same speed as the engine. However, the present invention is not limited to those arrangements where the electric machine has the same speed as the engine. For example the invention may also be used with integrated starter and alternator combinations where a belt drives the rotor of the electric machine at a different speed from the engine.

Figure 3:
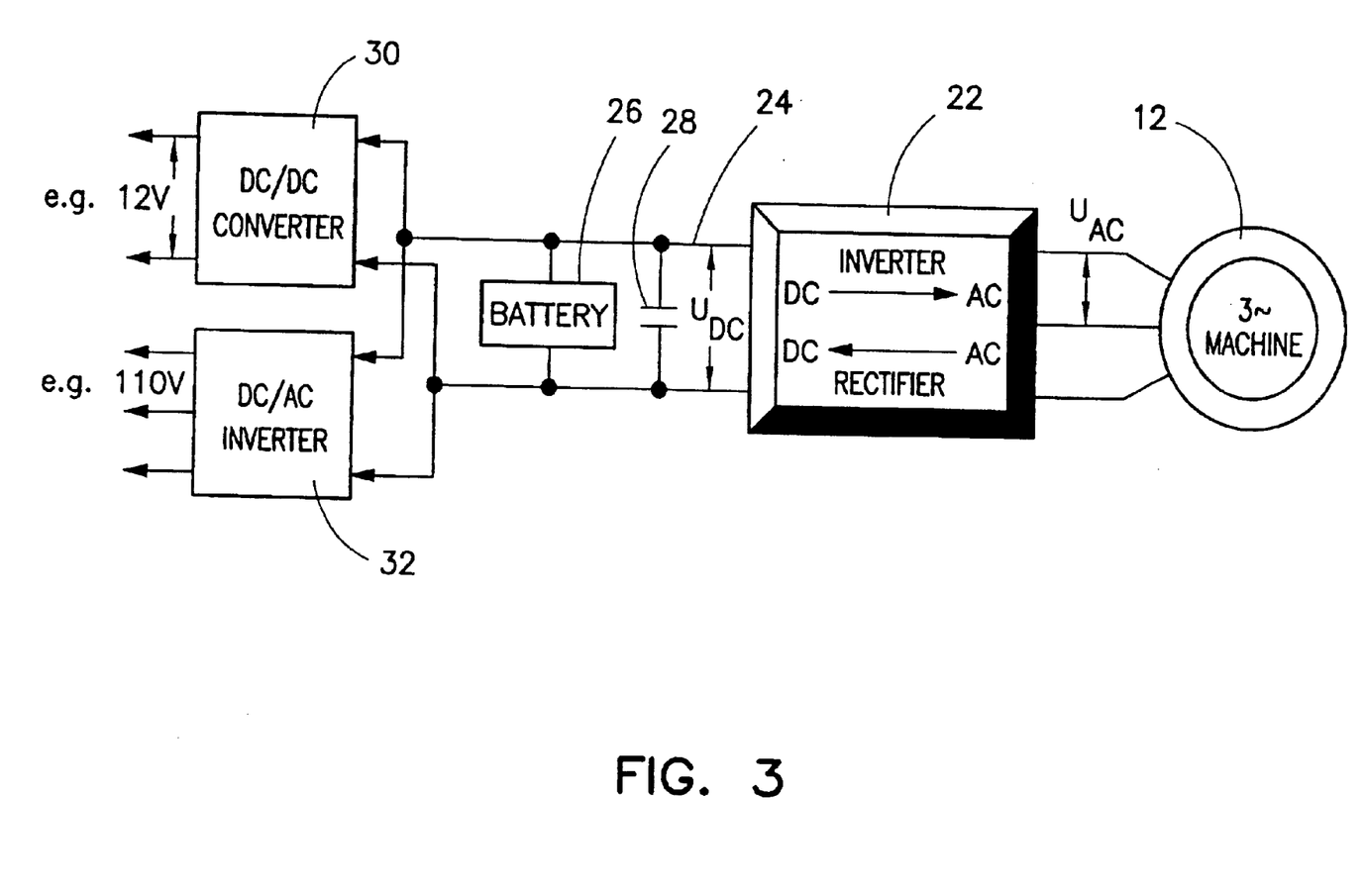
FIG. 3 shows the electrical connections between the ISAD electric machine and other engine systems.

FIG. 3 shows a general overview of the electrical connections of the ISAD electric machine within the engine. The ISAD electric machine 12 shown in FIG. 3 can be any of a number of different three phase alternating current electric machines, including, but not limited to, permanent magnet electric machines, induction machines or synchronous machines. The windings of the electric machine 12 are connected to an inverter/rectifier 22. The voltage difference between each line connecting the armature windings to the inverter/rectifier is the AC line-to-line voltage, $U_{AC}$. The inverter/rectifier 22 acts as an inverter to transform DC voltage into AC voltage when the electric machine operates as a motor, and acts as a rectifier to transform AC voltage into DC voltage when the electric machine operates as a generator. On the opposite side of the inverter/rectifier from the electric machine is a DC bus 24. The DC bus includes a battery (or batteries) 26 and capacitor 28 connected in parallel with the inverter/rectifier 22. A DC bus voltage, $U_{DC}$, exists on the DC bus 24. A DC/DC converter 30 is connected to the DC bus 24 to step down any DC voltages (e.g., 36V DC to 12V DC), as required by the load. A DC/AC converter 32 is also connected to the DC bus to transform the DC voltage into AC voltage, or a reverse transformation, as required by the load.

Most ISAD systems strive to meet several design parameters. For example, during cranking it is preferable for cranking torque to continuously be as high as possible, and at least greater than breakaway torque (e.g., 250 Nm). This high torque is needed even at low temperatures such as −29° C., as may be experienced in the cold of winter. Also, to reduce pollution, it is desirable for the cranking speed to be near or equal to idle speed (e.g., 450~500 rpm). During the short period of time when the ISAD is cranking the engine, the battery and capacitor, in parallel, provide the ISAD with the required cranking voltage through the DC/AC inverter 22. The maximum available electromagnetic torque at each speed can be used to crank the engine since the efficiency and power factor are not usually of significant concern during engine cranking. According to electric machine principles, the cranking torque is nearly proportional to the square value of the phase voltage of the machine (this especially true for induction machines). Therefore, sufficient phase voltage is an important issue because of its relation to cranking torque, and the efficiency and power factor are of particular relevance only if they affect the cranking voltage, and consequently the torque. Insufficient phase voltage to crank an engine is often encountered at low temperatures with batteries that are not fully charged. Accordingly, increased phase voltage is advantageous, as the cranking torque at all temperatures will increase if the phase voltage of the ISAD machine can be raised.

Once the engine is cranked, the electric power for charging batteries and running electric loads is required instantly. At this time, the ISAD rotor, which is installed directly on the crankshaft, settles in at its idle speed (e.g., 500 rpm). At idle speed the ISAD must provide at least a portion of the electric power required for normal operation of routine electric or electronic devices, such as air condition, heating system, electric blower, lights and audio or video system etc. Fifty-percent (50%) or more of the electric power required for normal operation is a typical design parameter.

After the engine launches and settles to idle, the ISAD operates as generator from idle speed through redline speed (e.g., 500~7000 rpm). At a boosted engine speed (e.g., 1000 rpm), the machine has to supply full electric power to all electric loads, onboard and/or off-board, if applicable. The capacity of the full electric power output and the high efficiency should be maintained continuously from the boosted speed till redline speed (e.g., 7000 rpm).

The following equations are provided to further describe the design principles associated with an ISAD machine.

The back EMF per phase, produced by resultant air-gap flux, can be written as set forth in the following equation:

$$E_g = \sqrt{2}\pi f N_\phi K_{dp} \Phi \quad \text{(equation 1)}$$

where $N_\Phi$ is winding turns per phase in series; $K_{dp}$ is the winding factor including distribution, pitch and skewing factors; $\Phi$ is the resultant flux amplitude per pole; and f is the frequency of AC voltage.

The frequency, f, of AC voltage can be given by the following equation:

$$f = \begin{cases} \dfrac{pn}{60} & \text{for synchronous machine} \\ \dfrac{p}{60}\dfrac{n}{1-s} & \text{for induction machine} \end{cases} \quad \text{(equation 2)}$$

where p is the number of pole pairs; s is the slip of induction machine whose value is positive for motoring state and negative for generating state; n is the speed of electric machine.

In the design of electrical machines, the relation between phase voltage and resultant back EMF can be given by the following equation:

$$U_{ph} = (1 \pm \epsilon) E_g \quad \text{(equation 3)}$$

where $\epsilon$ is a percentage variation because of voltage drop cross leakage impedance of the armature windings, depending on the phase current $I_1$, armature resistance $R_1$ and leakage reactance $X_1$, the "+" sign corresponds to motoring state, and the "−" sign corresponds to the generating state of the ISAD machine. That is, $U_{ph} > E_g$ for motoring operation, and $U_{ph} < E_g$ for generating operation. On the AC side of ISAD system in FIG. 3, the phase voltage $U_{ph}$ can be given by line-to-line voltage $U_{AC}$.

$$U_{ph} = \begin{cases} U_{AC} & \text{for } \Delta\text{-connection} \\ \dfrac{U_{AC}}{\sqrt{3}} & \text{for } Y\text{-connection} \end{cases} \quad \text{(equation 4)}$$

If a pulse width modulation frequency variable method is introduced to control the ISAD machine, the relation between AC line-to-line $U_{AC}$ and DC bus voltage $U_{DC}$ is governed by $$U_{AC(rms)} = K_C M_a U_{DC} \quad \text{(equation 5)}$$

where Kc is conversion coefficient and its value is between 0.61 and 0.78 depending on control strategies, such as vector space control, six-step control etc.; $Ma \leq 1$ is the modulation depth for the PWM method. DC bus voltage can be written as $$U_{DC} = U_{battery} \mp \mu |I_{DC}| R_{battery} \quad \text{(equation 6)}$$

where $\mu$ stands for non-constant battery resistance (which depends upon temperature and other factors), the "−" sign stands for the discharging state corresponding to motor operation, and the "+" sign stands for the charging state of batteries corresponding to generating state of the ISAD machine. In equation 6, the open circuit voltage $U_{battery}$ and internal Resistance $R_{battery}$ are not constants, depending on variables like temperature, charged state and even the current.

Figure 4:
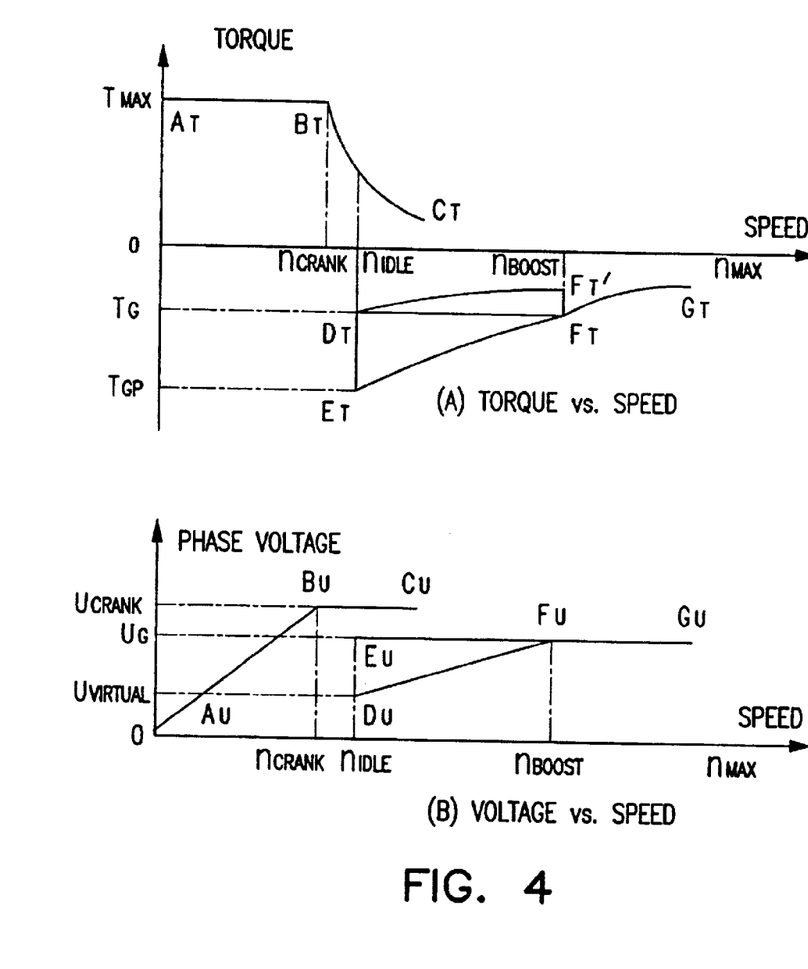
FIG. 4 shows the relationship between torque and speed and the relationship between phase voltage and speed in the design of an ISAD electric machine.

FIGS. 4(a) and 4(b) show an example of torque and voltage specifications and design requirements for a typical ISAD machine. In particular, FIG. 4(a) shows the design relationship between torque and speed for a typical ISAD machine, and FIG. 4(b) shows an example of the design relationship between phase voltage and speed in a typical ISAD machine.

With reference to FIG. 4(a), $T_{max}$ is the output torque available from the electric machine to crank the engine. This torque is delivered from the ISAD machine over the segment $A_T B_T$ until the speed of the machine reaches $n_{crank}$ and the engine fires. As discussed previously, it is preferable for cranking torque to be as high as possible. As torque requirements increase, a larger machine size is required to meet high cranking torque at severe conditions. Otherwise the system will face an insufficient cranking voltage challenge. With sufficient torque, the engine will crank and fire. Thereafter, the output torque of the electric machine falls off, as shown between points $B_T$ and $C_T$. With reference to FIG. 4(b), the phase voltage of the electric machine continually increases with speed until the cranking speed is reached, as shown by segment $A_u B_u$.

After the engine fires, the electric machine acts as a generator as torque is input to the electric machine from the engine and the electric machine delivers electric current to the inverter/rectifier. Accordingly, the generated torque, $T_G$, is shown in FIG. 4(a) as a negative value. Once the ISAD electric machine starts operating as a generator, it would be ideal for the electric machine to immediately output maximum electric power capable of satisfying the electrical requirements for the entire load (i.e., 100% loading). This 100% loading level is shown by segment $E_U F_U$ in FIG. 4(b). However, if the ISAD electric machine were designed to output maximum electric power at the idle speed of the engine (i.e., point $E_U$ in FIG. 4(b)), a dramatic increase in the size of the electric machine would be required, since this would be equivalent to an electric machine design with a large torque at low speed (i.e., point $E_T$ in FIG. 4(a)). On the other hand, if the electric machine is only required to provide a part of the necessary electric power (e.g., 50% fill load) at idle speed, as shown by point $D_U$ in FIG. 4(b), and the full electric power output from the electric machine is delayed until the electric machine is operating at a boosted speed, the machine size can be reduced since the design point is shifted to $D_T$ in FIG. 4(a). In this situation, because the electric machine is only providing a part of the full electric power, some loads may be turned off until the machine reaches a boosted speed. This method is known as the "load match" method and is widely used for design of alternators for heavy duty vehicles with external electric loads. Of course, when the electric machine is only providing a part of the full electric power requirement at idle speed, the battery is not being charged. In fact, sometimes the battery may actually be picking up part of the load requirement. Therefore, it would be preferable for the electric machine to provide as much output power as possible near the 100% loading level.

In addition to 100% loading, it is desirable to keep a constant charging voltage ($U_{DC}$) on the DC bus 24 (see FIG. 3) when the electric machine operates as a generator. A constant charging voltage provides continuous output to the load and properly returns charge to the battery 26. Assuming that the design point of the ISAD is point $D_T$, as discussed in the preceding paragraph, the phase voltage at idle speed will be significantly less (e.g., 50%) than the phase voltage required for 100% loading. The torque segment $D_T F_T$ in FIG. 4(a) corresponds to the voltage segment $D_u F_u$ in FIG. 4(b). Of course, it is difficult to keep a constant charging voltage ($U_{DC}$) on the DC bus 24 of FIG. 3 if the AC voltage of the generator output varies along curve $D_u F_u$ from idle speed $n_{idle}$ to a boosted speed $n_{boost}$, especially when there is a large speed difference between the boosted speed and the idle speed. As mentioned previously, it is preferable to keep the AC line-to-line voltage constant, similar to the segment $E_u F_u$ in FIG. 4(b). However, achieving constant voltage requires performance of flux weakening within the speed variation range. Flux weakening is not desirable in this situation because it results in a smaller power factor and decreased efficiency of the machine. Therefore, constant voltage may not be practical. The requirement for flux weakening to keep a constant AC line-to-line voltage is shown with respect to equations 1–4. In particular, equations 3 and 4 show that AC voltage is directly related to the back EMF, Eg. Furthermore, equation 1 shows that only flux and frequency (i.e., speed, per equation 2) are variable with respect to the back EMF, Eg. Thus if frequency increases, flux must decrease to keep the per phase back EMF constant.

As shown in FIG. 4(b), once the speed of the electric machine reaches a boosted speed, $n_{boost}$, full electrical output is produced by the electric machine. Thereafter, the electric machine is controlled so its output power remains constant at this level. This control may be achieved by controlling the flux of the machine and/or by controlling the output of the inverter/rectifier. This speed range is called the constant power region or the flux weakening region. Controlling the electrical output prevents the electric machine from providing to much current and damaging the sensitive instruments associated with the load.

Accordingly, there is a need in the art for an electric machine that is capable of providing increased torque at starting, increased phase voltage near engine idle speed, and constant 100% loading near boosted engine speed. It would be preferable to provide such a machine without requiring significant increases in the size of the electric machine and without sacrificing the efficiency of the machine.

SUMMARY

An electric machine is provided for use as both a starter and an alternator in an engine. The electric machine is operable to run at various speeds including a cranking speed when the electric machine acts as a starting motor to crank the engine, an idle speed after the engine has fired and the electric machine is operating as a generator, and a boosted speed when the engine is running at a relatively high speed and the electric machine is carrying the full electric load of all on-board and/or off-board instruments. The electric machine comprises a stator having at least three stator windings and a rotor disposed in proximity to the stator such that the rotor is in electro-magnetic communication with the stator. The rotor is operable to rotate at a plurality of speeds, including the cranking speed, the idle speed and the boosted speed. A plurality of wye switches are connected between the three stator windings such that closure of the wye switches will cause the three stator windings to be connected in a wye configuration. In addition, a plurality of delta switches are connected between the three stator windings such that closure of the delta switches will cause the three stator windings to be connected in a delta configuration. A microprocessor is provided in communication with the plurality of delta switches and wye switches. The plurality of delta and wye switches may be a number of different types of switches, including transistor switches and electro-mechanical switches, but bi-directional thyristers switches are preferred. The microprocessor is operable to communicate instructions to (i) close the delta switches during cranking of the engine, (ii) close the wye switches when the engine has started and the speed of rotor rotation is about equivalent to the idle speed, and (iii) close the delta switches when the speed of rotor rotation is about equivalent a winding reconfiguration speed above 1.3 times the idle speed. Accordingly, the armature windings of the electric machine are connected in a delta connection during engine cranking, in a wye connection at engine idle speed, and in a delta connection during high engine speeds. Although the winding reconfiguration speed may be 1.3 times or more the engine idle speed, the winding reconfiguration speed will typically be about 1.7 times or more the idle speed.

DESCRIPTION

Figure 5:
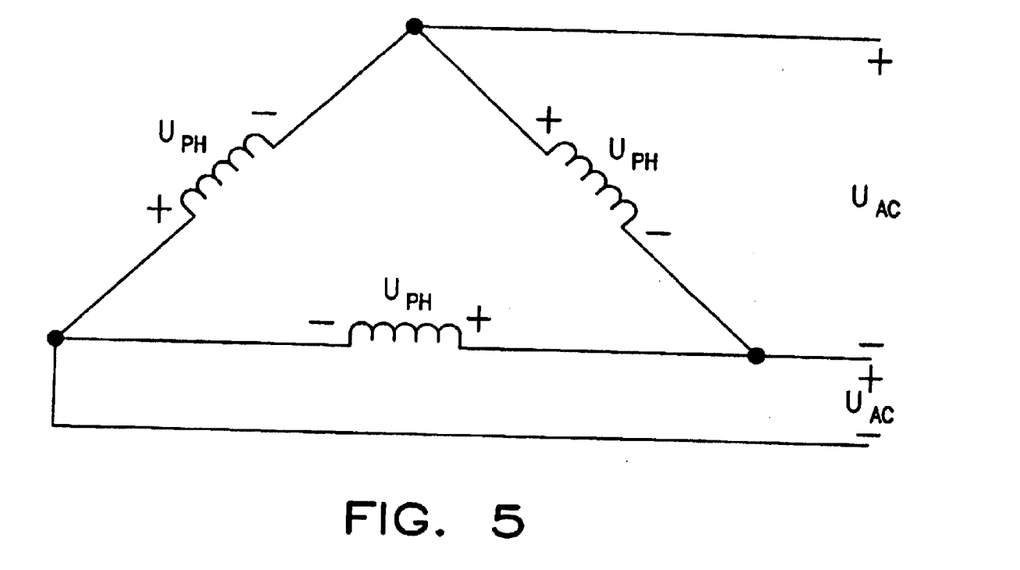
FIG. 5 shows a three phase armature winding in a delta-connection.
Figure 6:
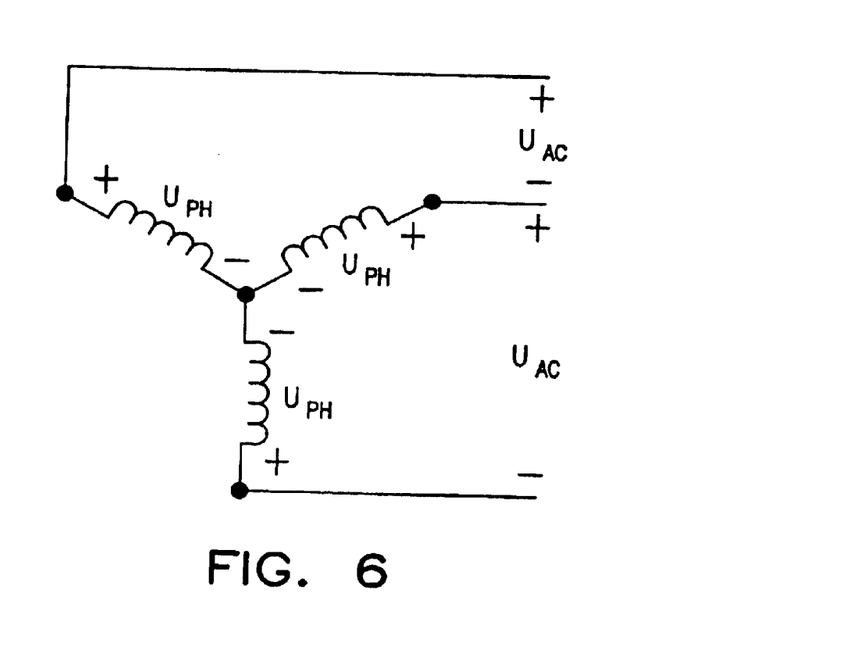
FIG. 6 shows a three phase armature winding in a wye-connection.

As used herein the symbol "Δ" refers to a delta connection of at least three windings, connected similar to that shown in FIG. 5. The symbol "Y" refers to a wye connection (a.k.a. "star" connection) of at least three windings, connected similar to that shown in FIG. 6.

Figure 7:
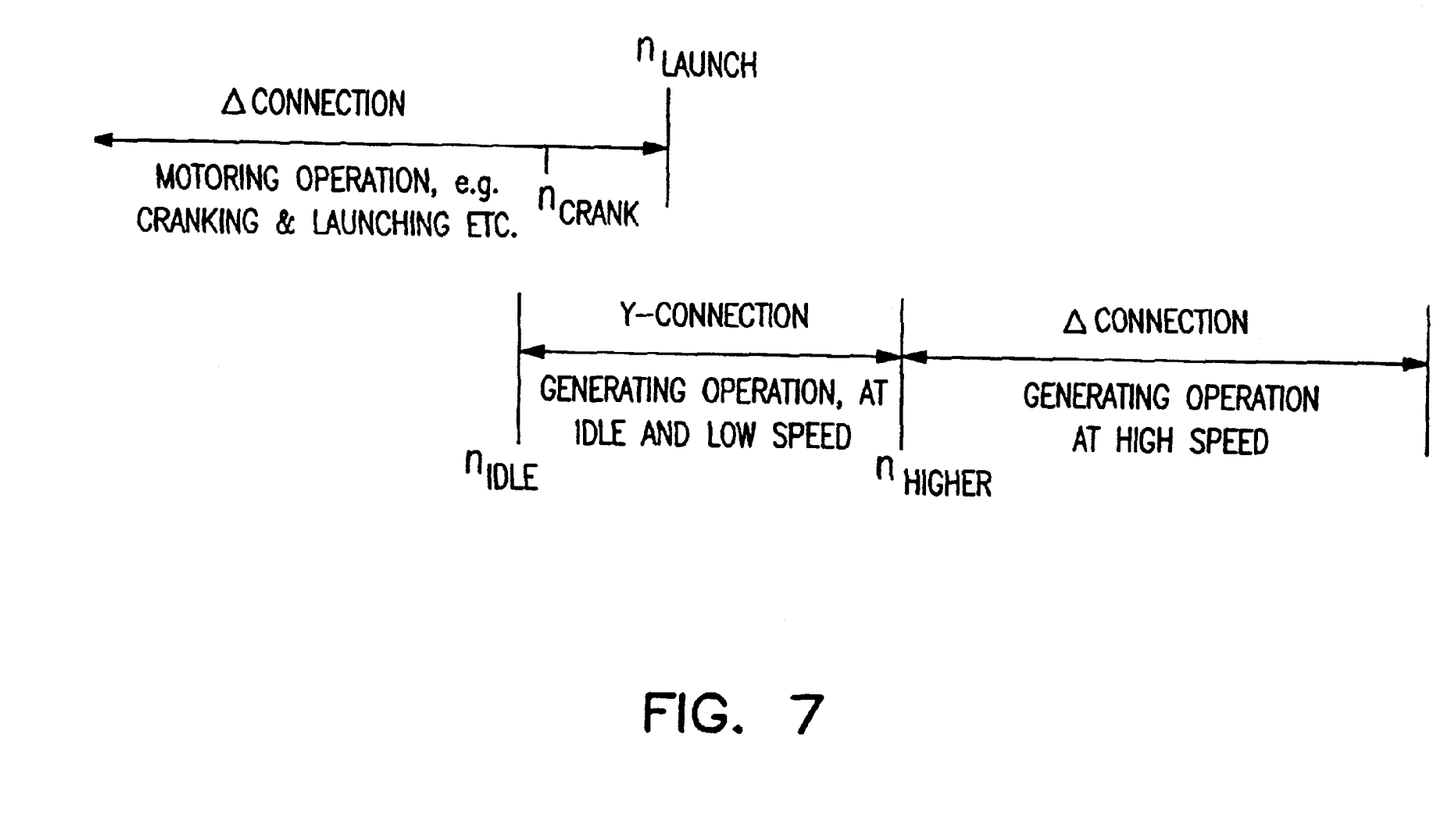
FIG. 7 shows a sequence for manipulating the three phase armature windings between a delta-connection and a wye-connection.

With reference to FIG. 7, phase voltage issues associated with the ISAD electric machine are manipulated by switching the armature windings in a ΔYΔ (i.e., delta/wye/delta) fashion. In particular, the armature windings are arranged in a Δ connection during cranking, when the ISAD acts as a starter motor. This connection increases the phase voltage during cranking and therefore solves the low cranking torque problem due to low battery voltage, which typically occurs in cold weather. After the engine is cranked, the windings are changed into a Y connection when the ISAD machine changes from motoring to generating. This connection creates a higher AC line voltage for charging the battery at idle speed and up. Furthermore, this Y connection reduces high saturation of the magnetic circuit at low speed and increases the efficiency of the machine. Next, when the engine speed increases above a predetermined winding reconfiguration speed, the windings are switched from Y to Δ connection. The Δ connection at this speed helps limit the AC line voltage and improves performance at high speed due to the increased magnetic flux associated with a Δ connection. If the engine speed falls below the winding reconfiguration speed, the machine again switches the armature windings to a Y connection to take advantage of the efficiencies of the Y connection at that speed range.

Rationale for Δ-Connection for Cranking and Launching Operation

When cranking the engine, the ISAD electric machine operates in a motoring state, providing torque to crank the engine. In a motoring state, the available DC bus voltage determines the maximum available line-to-line voltage for the electric machine. The maximum available line-to-line voltage, $U_{AC}$, is related to the DC bus voltage, $U_{DC}$, as follows: $U_{AC} < 0.61 \sim 0.78 U_{DC}$, depending on control strategies used in the inverter 22. According to equation 6 referenced in the Background, the DC bus voltage, $U_{DC}$, is sometimes less than the open circuit voltage of the battery. For example, for a 36V battery, $U_{DC}$ may be less than 36V, depending on the charged state of the battery and the temperature of the battery. As shown in FIG. 4(b), when first starting to turn the electric machine, the required phase voltage is not very high since the lowest starting frequency is very low (e.g., 8~15 Hz for most machines). With increase of the frequency (and consequently the engine speed) the required phase voltage increases. The phase voltage variation with speed is from $A_u$ to $B_u$, in FIG. 4(b). Accordingly, it is necessary for the battery and capacitor to provide sufficient DC voltage, resulting in a sufficient phase voltage, $U_{ph}$, to produce the required torque $T_{max}$ at each speed, and continuously accelerate the engine until the engine speed approaches and reaches the cranking speed $n_{crank}$. This is especially true when the cranking speed is required to be as high as possible, even near or equal to the idle speed.

Equations 4–6 show that a higher phase voltage will be provided through a Δ-connection during cranking. In particular, equation 5 shows that the AC line-to-line voltage is directly proportional to the DC bus voltage. Thus, if only a given DC bus voltage is available, as is the case during engine cranking, a proportional AC line-to-line voltage will be available. However, according to equation 4, a Δ-connection for the three phase armature windings will provide a higher phase voltage than a Y-connection. The higher phase voltage, $U_{ph}$, provided by the Δ-connection will increase the output torque of the machine at cranking speed $n_{crank}$. Accordingly, a Δ-connection is used during engine cranking, and the engine is more likely to crank and launch at a given time by using the Δ-connection instead of the Y-connection.

Rationale for Y-Connection for Electric Power Generation at Idle and Low Speeds

Once the engine is cranked and launched, its speed settles into an idle speed. As shown in FIG. 7, upon reaching idle speed following engine launch, the ISAD machine acts as a generator to provide the electric power for running the electric load and charging the battery. In a generating state, the phase voltage that can be generated in the three phase armature windings at any given speed determines the maximum available DC voltage that may be used to provide power to the load at that same speed. Although the power required at idle or other low speeds (i.e., those speeds less than the winding reconfiguration speed, defined below) is a relatively small amount (e.g., 50% full load), it is desirable to have the output voltage of the ISAD machine as close to full loading as possible at all times. In addition, it is desirable for the output voltage of the ISAD machine to be at a constant level during idle, as certain loads depend upon the output of the electric machine.

With the foregoing in mind, it is preferable for the AC line-to-line voltage during generation to be at a high level (e.g., preferably even higher than the maximum available AC cranking voltage). As an example, for a 36 V battery used for cranking the engine, the DC bus voltage, $U_{DC}$, might need to equal about 42V for charging the battery and delivering full power to the load. As discussed previously, the ISAD machine can be sized according to this full loading operation point, but this will lead to an oversized machine. However, if the winding connections are changed from Δ-connection at cranking state to Y-connection at idle state, the required phase voltage to produce the same line-to-line voltage for battery charging, will be reduced by $1/\sqrt{3}$, according to equation 4. In other words, based on the available phase voltage when the electric machine acts as a generator, the maximum AC line-to-line voltage will be increased by $\sqrt{3}$ when a Y-connection is used instead of a Δ-connection. Thus, the output power of the ISAD is increased, although the phase voltage remains constant. This allows the output power of the ISAD to be closer to 100% loading than would otherwise be possible without increasing the size of the machine. The Y-connection of stator windings can also relieve magnetizing saturation of lamination core, and consequently increase the efficiency and the power factor of the ISAD machine at the idle speed and other low speeds.

Rationale for Δ-Connection for Electric Power Generation at High Speeds

As discussed previously, only a fraction of the power requirements for 100% loading is required at the typical engine idle speed. However, certain vehicles are required to carry extra on-board and/or off-board electric loads besides the routine electric loads carried at idle speed. This is especially true of trucks. The full electric power output required to supply these extra loads as well as the battery charging load must be provided at boosted speeds, e.g., speeds achieved during high speed driving. Typically, the "boosted" speeds are those speeds significantly above idle speed, such as 1.3, 1.7 or 2 or more times the idle speed. The term "higher electric machine speeds" is used herein refers to those electric machine speeds that are 1.3 or more times the idle speed (even if such a speed is not a "boosted" speed). In addition to meeting the voltage requirements for the load at a given boosted speed, it is also important that the voltage available on the DC bus remain constant over the period of boosted speeds so the load may be continually supplied and the battery may be properly charged.

As indicated by equation 1, the increased speed of the electric machine will naturally result in an increase in the back EMF, provided the flux is not decreased. Of course, as indicated by equation 3, the back EMF is directly related to the phase voltage. Thus, the phase voltage will continuously increase as speed increases (provided the flux is not reduced). Furthermore, the phase voltage is directly related to the AC line-to-line voltage, and the AC line-to-line voltage is directly related to the DC bus voltage. Thus, as the speed of the electric machine increases, the DC bus voltage will also increase, assuming that the flux of the machine remains constant. However, if the DC bus voltage becomes too elevated, damage can result to the system, including damage to critical load components and the battery. This means that it is important to keep the DC bus voltage as near to full loading as possible without providing excessive DC bus voltage (i.e., it is important to keep the DC charging voltage constant).

The DC bus voltage can be limited at higher electric machine speeds by changing the armature winding configuration from a Y-connection to a Δ-connection. First, note that by changing the armature winding configuration from a Y-connection to a Δ-connection at higher electric machine speeds, the AC line-to-line voltage is reduced according to equation 4, thereby reducing the DC bus voltage at these higher electric machine speeds. Next, with an increase in the speed of the engine, and consequently frequency, the ISAD machine as a generator operates in the field weakening region. According to equation 1, as speed increases the flux may be reduced to keep constant voltage output. If this is done with a Y-connection at higher electric machine speeds, the magnetizing current is increased due to flux weakening, and low efficiency and a low power factor result. However, adjustment of the flux with a Δ-connection does not have the same effect on efficiency and power factor as it does with a Y-connection because the phase voltage in the delta connection is higher than the Y-connection at the same line-to-line voltage level. Therefore, by changing the stator winding connection from a Y-connection to a Δ-connection, and adjusting the flux of the electric machine, a constant voltage output for operation at 100% loading and charging the batteries is provided. Furthermore, the DC bus voltage may be regulated at higher electric machine speeds by the inverter/rectifier positioned between the AC line-to-line voltage and the DC bus voltage which is ready for next cranking.

After the machine operates for some time at a higher electric machine speed, it will eventually return to near idle speed. When this happens, control software automatically resets the armature windings for a Y-configuration. Thereafter, if the engine stops running, the machine windings are automatically reset to Δ-connection by the control software.

Switches of the Δ/Y/Δ Reconnection

Figure 8:
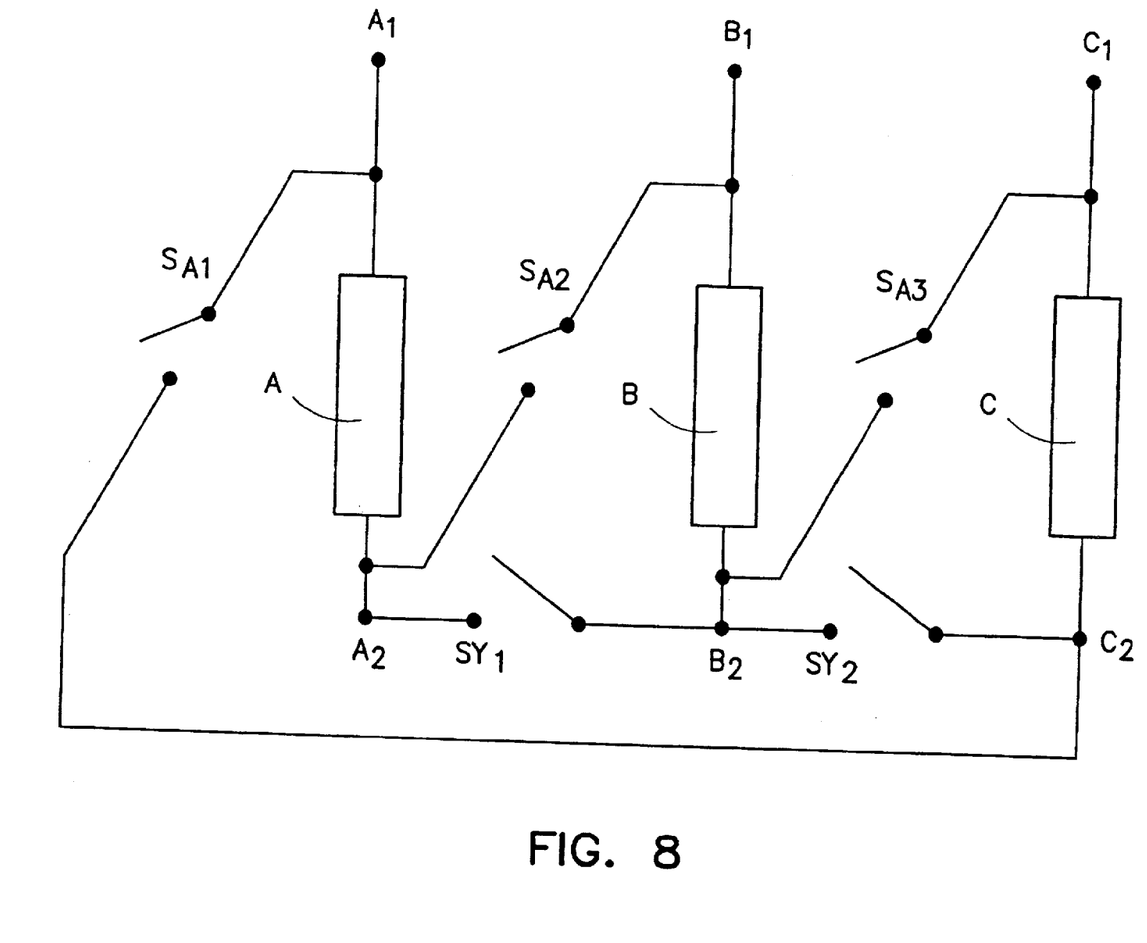
FIG. 8 shows a switching arrangement for accomplishing the manipulation of three phase armature windings between a delta-connection and a wye-connection.

To change the stator winding connection between Y and Δ connections, five extra switches are used between the armature windings, as shown in FIG. 8. Windings A, B, and C are shown in FIG. 8 with each winding having a beginning portion represented by nodes $A_1$, $B_1$, and $C_1$, respectively, and an ending portion represented by nodes $A_2$, $B_2$ and $C_2$, respectively. Three switches are used to establish a Δ-connection between the windings. These three switches are (i) switch $S_{\Delta 1}$ connected between node $A_1$ and $C_2$, (ii) switch $S_{\Delta 2}$ connected between node $B_1$ and $A_2$, and (iii) switch $S_{\Delta 3}$ connected between node $C_1$ and $B_2$. These switches are referred to herein as delta switches. Two switches are used to establish a Y-connection between the windings. These two switches are (i) switch $S_{Y1}$ connected between node $A_2$ and $B_2$, and (ii) switch $S_{Y2}$ connected between node $B_2$ and $C_2$. These switches are referred to herein as wye switches. The delta and wye switches can be any of a number of different types of switches, including, but not limited to, MOSFET, IGBT, GTO, thyristor or even electro-mechanical switches as long as they can be bi-directional conducting. The delta and wye switches preferably have minimum conducting voltage drop in order to reduce additional switch loss. Although electro-mechanical contact switches may be used, they are not preferred due to their longer response time. For sake of control convenience and cost reduction, five bi-directional thyristers switches (a pair of anti-parallel thyristors per switch) are recommended.

Figure 9:
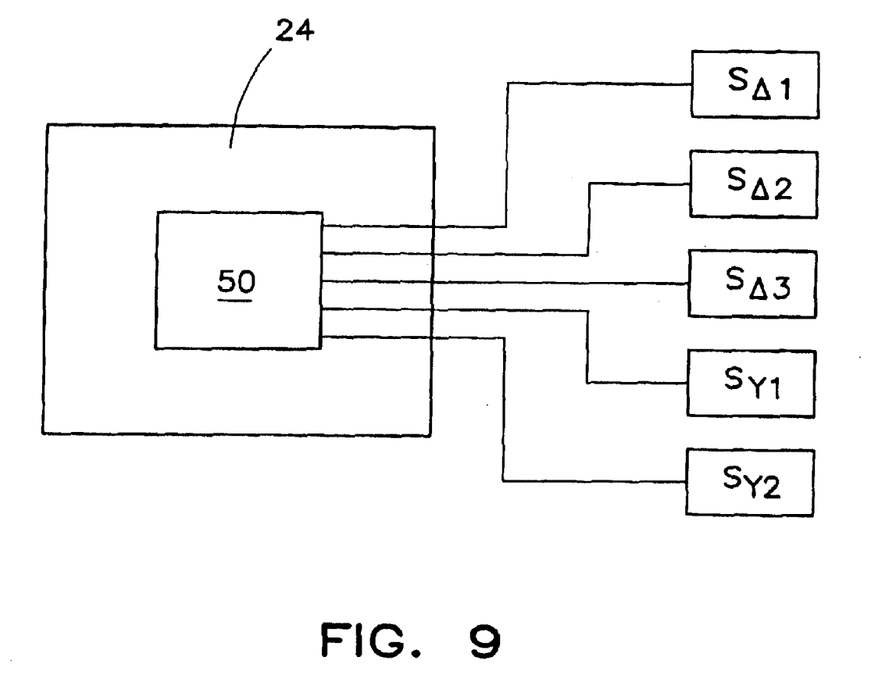
FIG. 9 shows a microprocessor in communication with the switches of FIG. 8.

As shown in FIG. 9, a microprocessor 50 is in communication with the switches, $S_{\Delta 1}$, $S_{\Delta 2}$, $S_{\Delta 3}$, $S_{Y1}$, or $S_{Y2}$, and determines when the switches, $S_{\Delta 1}$, $S_{\Delta 2}$, $S_{\Delta 3}$, $S_{Y1}$, or $S_{Y2}$, should be opened or closed. If a particular switch is to be closed, a signal is delivered to that switch causing the switch to be closed, based on a control signal by the microprocessor. The microprocessor, along with the inverter/rectifier and controller, may be placed in the electronics control box 24 or any other convenient and practical location.

As shown with respect to FIG. 7, the switches are opened or closed depending upon the state of the electric machine and its speed. Thus, when cranking the engine, the microprocessor configures the switches in a Δ-connection until immediately after cranking when the machine launches. Thereafter, the electric machine operates as a generator as the speed of the machine settles to an idle speed. Of course, the idle speed of the engine will vary from application to application. During idle speed and low speeds, the microprocessor configures the switches in a Y-connection. Following idle and low speeds, when the electric machine is operating at a higher electric machine speed, the microprocessor reconfigures the switches in a Δ-connection. This higher electric machine speed where the microprocessor reconfigures the switches from a Y-connection to a Δ-connection, is referred to as the "winding reconfiguration speed" or "reconfiguration speed". The reconfiguration speed from a Y-connection to a Δ-connection will vary, depending upon the needs of the user. For example, in one application, such as a hybrid automobile application, a desired winding reconfiguration speed may be 1.7 times or more engine idle speed. As another example, in a heavy-duty truck application, the desired winding reconfiguration speed may be 1.9 times or more the engine idle speed. Typically, the winding reconfiguration speed for changing the windings from a Y-connection to a Δ-connection is at least near or equal to the boosted speed of the electric machine. The reconfiguration speed at which the microprocessor changes the configuration of the armature windings from a Y-connection to a Δ-connection may be programmed into the microprocessor, depending upon the desired and advantageous switching speed for the customer.

EXAMPLE

Figure 10:
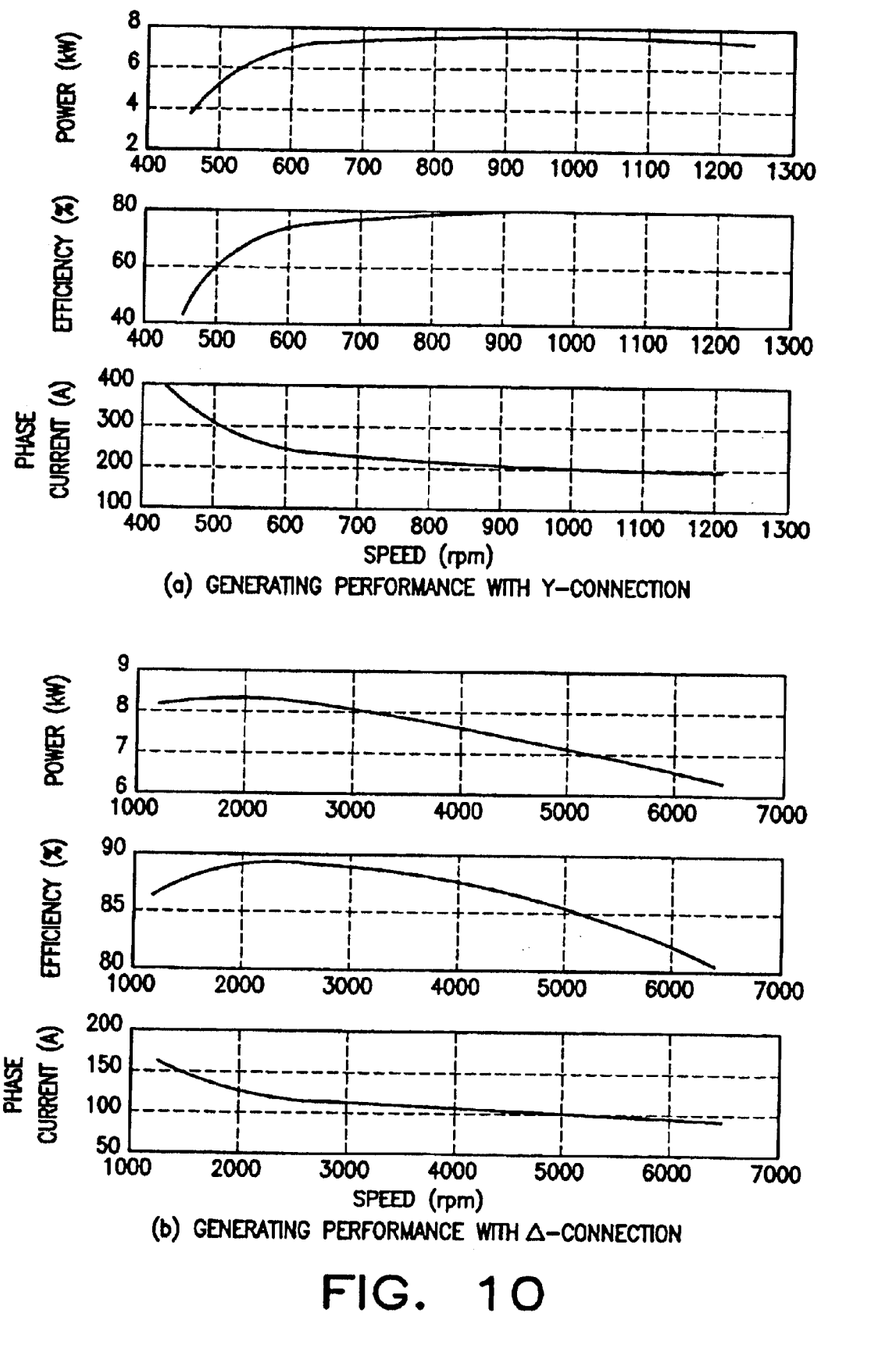
FIG. 10 shows performance curves for an exemplary ISAD machine.

An example of operating characteristics of a 42 V (36V battery open circuit voltage) ISAD machine is provided with respect to FIG. 10. FIG. 10(a) shows performance curves charting the power, efficiency, and phase current vs. the speed of the exemplary ISAD machine when the windings are configured in a Y-configuration. FIG. 10(b) shows performance curves charting the power, efficiency, and phase current vs. the speed of the exemplary ISAD machine when the windings are configured in a Δ-connection. A particular customer may be interested in an ISAD machine having the following operational characteristics:

Cranking torque at 450 rpm and −29° C.: 280 Nm;

Generating power at an idle speed of 550 rpm: 4 kW with efficiency >60%;

Generating power at a boosted speed of 1300 rpm: 8 KW with efficiency >85%;

Generating power at 6000 rpm: 6 kW with an efficiency >80%.

With the above operating parameters, determination of a proper "winding reconfiguration speed" may be made by viewing the performance curves. It is first noted from FIG. 10(a) that the power of the ISAD electric machine peaks near 8 kW at 700 or 800 rpm with a Y-connection. Similarly it is noted that the efficiency of the ISAD electric machine levels off to 80% near 1000 rpm with a Y-connection. Second, it is noted from FIG. 10(b) that the power of the ISAD electric machine is above 8 kW at 1200 rpm, peaks at about 8.3 kW near 1500 rpm, and then slowly declines to about 6 kW at 6300 rpm with a Δ-connection. Similarly, the efficiency of the ISAD electric machine is above 85% at 1200 rpm, peaks to about 89% near 2100 rpm, and then falls off to 80% near 6300 rpm. Accordingly, the customer's needs for the ISAD machine may be met by setting the winding reconfiguration speed where the ISAD machine switches from a Y-connection to a Δ-connection near or less than 1200 rpm (e.g., about 2.4 times idle speed).

Depending upon a particular customer's requirements, the winding reconfiguration speed for changing the winding configuration from Y to Δ-connection will change. Typical winding reconfiguration speeds include speeds that are 1.7 or more times the idle speed. In addition winding reconfiguration speeds that are 1.3 or more times the idle speed will occasionally occur. However, it has been observed that there are only rare situations where the winding reconfiguration speed would fall below 1.3 times the idle speed.

Although the present invention has been described in considerable detail with reference to certain preferred versions and exemplary embodiments thereof, other versions are possible. For example, although the invention has been described with reference to an ISAD electric machine, other types of alternator/generators may be used instead of an ISAD-type electric machine. In addition, the type of electric machine used with the present invention is not limited to induction machines, and other types of electric machines may be used including permanent magnet machines, synchronous machines, Lundell machines and any other type of three-phase electric machine that is capable of operation as both a motor and a generator. Furthermore, the invention could be incorporated in to an axial air-gap machine, such as a disc-type three phase machine (either stator-rotor-stator or rotor-stator-rotor type). Therefore, the spirit and scope of the appended claims should not be limited to use of the invention in the specific ISAD-type machine disclosed herein.

Another example of an alternative embodiment of the invention is use of the Y-connection at very low speeds. In particular, during cranking, a Y-connection could still be used at the low frequency (or speed) range, and the stator windings could be reconfigured to Δ-connection while approaching cranking speed or under low battery charged state or cold temperature. Although this alternative embodiment would increase the complexity of system control, it would provided improved results in the operation of the electric machine. In addition, other switching arrangements could be used to accomplish the switching of the armature windings between a Y-connection and a Δ-connection. Furthermore, modifications to the delta and wye configurations disclosed herein could be easily made without departing from the scope of the invention, such as providing six armature windings, with pairs of windings in series or parallel, but nevertheless resulting in delta or wye winding configurations. Therefore, the spirit and scope of the appended claims should not be limited to the description of the versions contained herein.

What is claimed is:

1. An electric machine for use as both a starter and an alternator in an engine, the electric machine operable to run at various speeds including a cranking speed, an idle speed, and a winding reconfiguration speed, the electric machine comprising:
   a. a stator having three phase stator windings;
   b. a rotor disposed in proximity to the stator such that the rotor is in electromagnetic communication with the stator, the rotor operable to rotate the various speeds;
   c. a plurality of wye switches connected between the three phase stator windings such that closure of the wye switches will cause the three phase stator windings to be connected in a wye configuration;
   d. a plurality of delta switches connected between the three stator windings such that closure of the delta switches will cause the three phase stator windings to be connected in a delta configuration;
   e. a microprocessor in electric communication with the plurality of delta switches and wye switches, the microprocessor operable to communicate instructions to (i) close the delta switches during cranking of the engine, (ii) close the wye switches when the engine has started and the speed of rotor rotation is about equivalent to the idle speed, and (iii) close the delta switches when the speed of rotor rotation is about equivalent to the winding reconfiguration speed.

2. The electric machine of claim 1 wherein the idle speed is about 500 rpm.

3. The electric machine of claim 1 wherein the winding reconfiguration speed is a boosted speed.

4. The electric machine of claim 1 where the winding reconfiguration speed is about 1.7 times the idle speed.

5. The electric machine of claim 1 wherein the plurality of delta switches are bi-directional switches.

6. The electric machine of claim 1 wherein the plurality of wye switches are bi-directional switches.

7. A method of controlling an electric machine for use in association with an engine, the electric machine having armature windings and a rotor capable of rotating at various speeds, the method comprising:
   a. connecting the armature windings in a delta connection and operating the electric machine as a cranking motor during engine cranking;
   b. connecting the armature windings in a wye connection and operating the electric machine as a generator after the engine has started and when the rotor is rotating at a low speed; and
   c. connecting the armature windings in a delta connection and continuing to operate the electric machine as a generator when the rotor is rotating at a higher electric machine speed.

8. The method of claim 7 where the low speed is near engine idle speed.

9. The method of claim 7 wherein the armature windings are connected in a delta connection when the higher electric machine speed is a boosted speed.

10. The method of claim 7 wherein the higher electric machine speed is greater than 1.3 times the idle speed.

11. The method of claim 7 wherein the higher electric machine speed is greater than 1.7 times the idle speed.

12. The method of claim 7 wherein a plurality of delta switches are used to connect the armature windings in a delta connection.

13. The method of claim 7 wherein a plurality of wye switches are used to connect the armature windings in a wye connection.

14. A method of operating an electric machine for use as both a starter and an alternator in an engine, the electric machine having at least three stator windings and a rotor disposed in proximity to the stator such that the rotor is in electro-magnetic communication with the stator and operable to rotate at a plurality of speeds including a cranking speed, an idle speed, and a winding reconfiguration speed, the method comprising:
   a. providing a plurality of wye switches connected between the three stator windings such that closure of the wye switches will cause the three stator windings to be connected in a wye configuration;
   b. providing a plurality of delta switches connected between the three stator windings such that closure of the delta switches will cause the three stator windings to be connected in a delta configuration;
   c. closing the delta switches so the stator windings are connected in a delta configuration during cranking of the engine;
   d. closing the wye switches so the stator windings are connected in a wye configuration during idle speed; and
   e. closing the delta switches so the stator windings are connected in a delta configuration at the winding reconfiguration speed.

15. The method of claim 14 wherein the winding reconfiguration speed is at least 1.3 times the idle speed.

16. The method of claim 14 wherein the winding reconfiguration speed is at least 1.7 times the idle speed.

17. An electric machine for use as both a starter and an alternator in an engine, the electric machine comprising:
   a. a stator having at least three stator windings;
   b. a rotor disposed in proximity to the stator such that the rotor is in electro-magnetic communication with the stator, the rotor operable to rotate at a plurality of speeds including a cranking speed, an idle speed, and a winding reconfiguration speed;
   c. a microprocessor in electric communication with a plurality of switches, the microprocessor operable to (i)

provide a control signal causing the stator windings to be configured in a delta connection when the rotor is rotating at the cranking speed, (ii) provide a control signal causing the stator windings to be configured in a wye connection when the rotor is rotating at the idle speed, and (iii) providing a control signal causing the stator windings to be configured in a delta connection when the rotor is rotating at the winding reconfiguration speed.

18. An integrated starter and alternator for use with an engine and a crankshaft, the integrated starter and alternator operable at a plurality of speeds including a cranking speed, a low speed, and a winding reconfiguration speed, the integrated starter and alternator operable as a cranking motor for the engine before it starts and operable as a generator driven by the engine after the engine starts, the integrated starter and alternator comprising:

a. a stator having a plurality of armature windings;
  b. a rotor in electromagnetic communication with the stator and connected to the crankshaft;
  c. means for connecting the armature windings in a delta configuration when the rotor is rotating at the cranking speed and the winding reconfiguration speed; and
  d. means for connecting the armature windings in a wye configuration when the rotor is rotating at a low speed.

19. The method of claim 18 wherein the low speed is a speed near idle speed.

20. An integrated starter and alternator for use with an engine, the integrated starter and alternator operable at a plurality of speeds including a cranking speed, a low speed, and a winding reconfiguration speed, the integrated starter and alternator operable as a cranking motor for the engine before it starts and operable as a generator driven by the engine after the engine starts, the integrated starter and alternator comprising:

a. a stator having a plurality of armature windings;
  b. a rotor in electromagnetic communication with the stator and connected to the engine by a belt;
  c. means for connecting the armature windings in a delta configuration when the rotor is rotating at the cranking speed and the winding reconfiguration speed; and
  d. means for connecting the armature windings in a wye configuration when the rotor is rotating at a low speed.

21. The method of claim 20 wherein the low speed is a speed near idle speed.

* * * * *